United States Patent [19]

Imase

[11] Patent Number: 4,829,851
[45] Date of Patent: May 16, 1989

[54] GEARLESS DIFFERENTIAL SPEED REDUCER STRUCTURE

[76] Inventor: Kenji Imase, 7-19, Kakimoto-cho, Toyota-shi, Japan

[21] Appl. No.: 111,088

[22] Filed: Oct. 19, 1987

Related U.S. Application Data

[63] Continuation of Ser. No. 58,654, May 22, 1987, abandoned, which is a continuation of Ser. No. 754,849, Jul. 12, 1985, abandoned.

[30] Foreign Application Priority Data

Jun. 27, 1985 [JP] Japan .................................. 141963

[51] Int. Cl.$^4$ .......................... F16H 13/06; F16H 1/28
[52] U.S. Cl. ......................................... 74/798; 74/804
[58] Field of Search ............... 74/798, 797, 796, 804, 74/465, 202, 640, 63, 206

[56] References Cited

U.S. PATENT DOCUMENTS

| | | | |
|---|---|---|---|
| 1,862,220 | 6/1932 | Johnson | 74/804 |
| 4,189,961 | 2/1980 | Yamashita et al. | 74/798 |
| 4,537,094 | 8/1985 | Bursa et al. | 74/804 |
| 4,542,664 | 9/1985 | Sladek et al. | 74/804 |
| 4,552,037 | 11/1985 | Distin, Jr. et al. | 74/804 |
| 4,554,846 | 11/1985 | Distin, Jr. et al. | 74/804 |
| 4,563,915 | 1/1986 | Tibbals, Jr. | 74/798 |
| 4,584,904 | 4/1986 | Distin, Jr. et al. | 74/804 |

Primary Examiner—Leslie A. Braun
Assistant Examiner—David Novais
Attorney, Agent, or Firm—Cooper & Dunham

[57] ABSTRACT

Gearless differential speed reducer comprising a first disc secured to a casing, a second rotary disc arranged to face the first disc, sinuous grooves provided with the facing sides of discs, the sinuous shapes of which are epicycloid and hypocycloid curves determined along a certain pitch circle, spherical balls provided between the discs to position into the grooves, and an eccentric shaft connected to the rotary disc through a bearing. Rotational movement of the eccentric shaft allows the rotary disc to rotate around one end of the shaft, while going along the pitch circle, since the balls rolls along the sinuous grooves. A single rotation of the shaft permits the rotary disc to travel by the length equivalent to that of two lobes of the grooves, yielding speed reduction ratio as a formula of $2/(N+2)$ when the groove of the first disc counts its number of lobes as N.

6 Claims, 8 Drawing Sheets

(a) epicycloid curve

(b) hypocycloid curve

GEARLESS DIFFERENTIAL SPEED REDUCER STRUCTURE

This is a continuation of application Ser. No. 058,654, filed May 22, 1987 which is a continuation of application Ser. No. 754,849 filed July 12, 1985 both abandoned.

BACKGROUND OF THE INVENTION

1. Field of the Invention

This invention relates to a speed reducer of high reduction ratio, and particularly concerns to a speed reducer improved so as to decrease its thickness dimension.

2. Description of the Prior Art

In a robot technology these days for example, a speed reducer has been provided with an electric motor to develop its speed into decreased rotation which is applied to a transfer arm. A speed reducer of this kind so far introduced are known as worm wheel reducer, a cyclo reducer, a harmonic drive reducer and the like.

However, a speed reducer particularly employed to robot technology is desired to satisfy the following advantages (i)~(V) upon securing a controlling precision. That is, (i) High reduction ratio with compact structure, (ii) High controlling precision with least play such as backlash action. (iii) Elevated rigidity with high meshing rate. (IV) Improved controllability with relatively small inertia force at rotary members. (V) Least loss of torque with minimum wear.

The prior art reducers previously mentioned have had more or less disadvantages, so that a speed reducer which satisfies all the advantages (i)~(V) is yet forthcoming.

Therefore, this invention has for its object to provide a novel reducer which satisfies all the advantages above so as to reply requests from the robot technology circle.

It is first object of the invention to provide a speed reducer structure which is capable of securing relatively high reduction ratio with compact construction.

It is second object of the invention to provide a speed reducer structure which is capable of eliminating a play such as backlash for high control precision.

It is third object of the invention to provide a speed reducer structure which is capable of securing improved rigidity with high meshing rate.

It is fourth object of the invention to provide a speed reducer structure which needs relatively small inertia force for rotary members to insure high controllability.

It is fifth object of the invention to provide a speed reducer structure which needs minimum loss of torque with least quantity of wear.

DETAILED DESCRIPTION OF THE PREFERRED EMBODIMENTS

Figure 1:
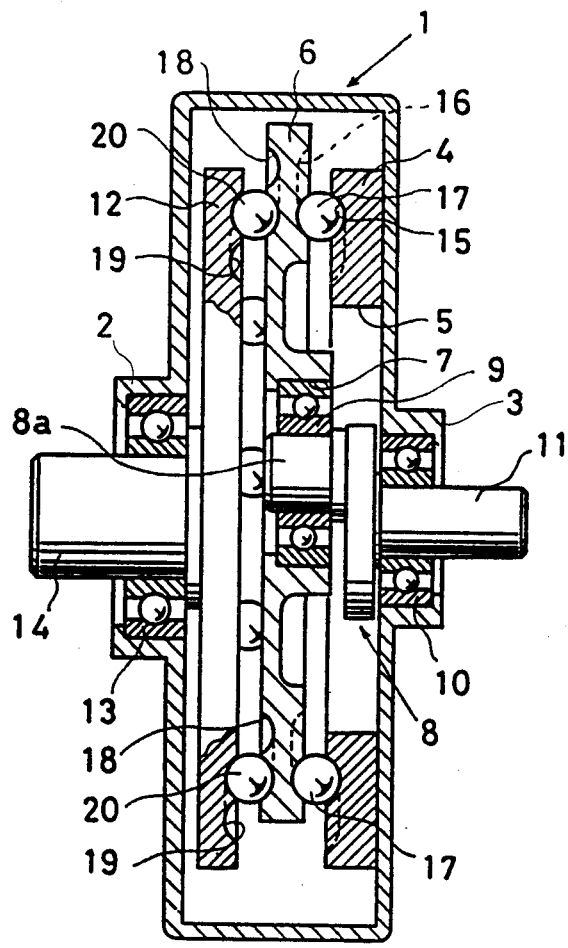
FIG.1 is a longitudinal cross sectional view of a speed reducer structure.

Referring first to FIG.1, numeral 1 designates a box-shaped casing according to first embodiment of the invention. Support flange 2, 3 are provided with horizontally opposed walls of the casing 1. A donut-shaped disc 4 is disposed in the casing 1, and rigidly secured to the right wall of the casing 1 so as to communicate its central hollow 5 with the flange 3. A circular disc 6 has a central boss 7, and disposed in the casing 1 to face the disc 4. An eccentric shaft 8 is placed in the casing 1 to position in the hollow 5 of the disc 4. The shaft 8 is mounted at one end 8a on the boss 7 of the disc 6 through a bearing 9, and at the other end 11 on the flange 3 through a bearing 10 to act as an input portion. In this instance, the shaft 8 directs its eccentricity to correspond to that of sinuous grooves described hereinafter. A rectifier disc 12 is placed in the casing 1 to face the circular disc 6, and has a central output shaft 14 mounted on the flange 2 through a bearing 13.

Figure 2:
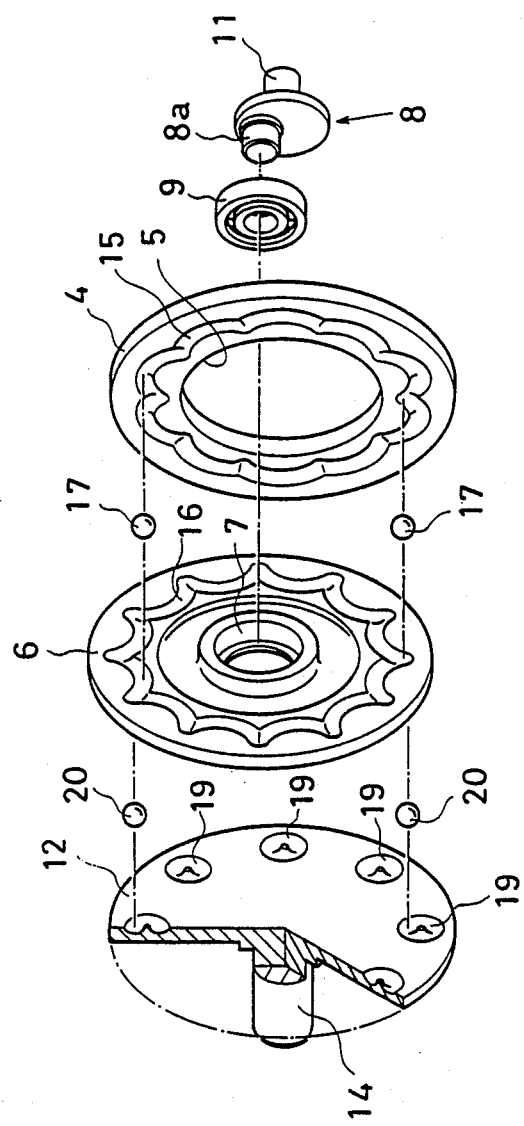
FIG.2 is a exploded view of the speed reducer structure.

Now on the surface of the disc 4 is a groove 15 semi-circular in section provided as seen in FIG.2. The sinuous groove 15 thus provided is in the form of epicycloid curve continuously carved on the disc 4 along a predetermined pitch circle with half the wave length as a lobe. Groove 15 is recessed as a valley in the direction perpendicular to the surface of the disc 4 and has two side walls of the same height and has a uniform width along the lobes thereof. The groove 15 counts the number of lobes as ten in this instance. On the other hand, the circular disc 6 has a sinuous groove 16 corresponding to that of the disc 4 on the surface facing the groove 15. The groove 16 is in the form of hypocycloid curve continuously carved on the disc 6 along the pitch circle identical to that just mentioned above with the number of lobes counting as twelve. Because it is necessary to establish an absolute differential number of 2 between the number of lobes from the disc 4 and that from the disc 6.

Figure 3:
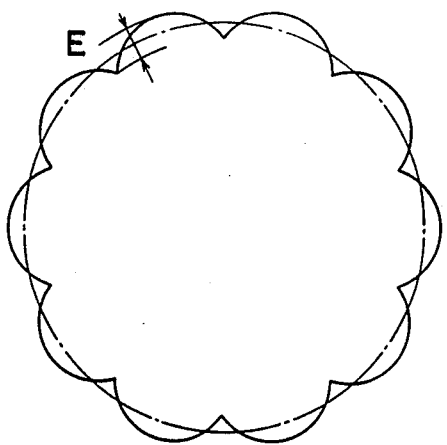
FIG.3 (a),(b) is an explanatory view of sinuous grooves.
Figure 3:
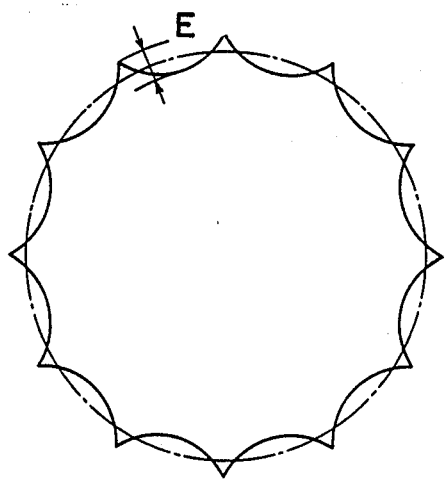

Regardig to the epicycloid and hypocycloid curves, they are each obtained by rolling one circle on another circle in circumscribing and inscribing relationship therewith as seen in FIG.3 (a),(b) in which height of the lobe is designated as E, the amount of which acts as an eccentricity. Between the discs 4 and 6, are spherical balls 17 which are made from such as, for example, a steel placed to position into both the grooves 15, 16 at regular intervals. The balls 17 specifies to count its number as eleven which is unexceptionally, given by adding one to the number of lobes from the groove 15, and adaped to roll along the grooves 15, 16 with the rotational movement of the disc 4. On each opposed surfaces of the disc 6 adn the rectifier disc 12, are identical groups of annular grooves 18, 19 provided, each diameter of which corresponds to the eccentricity based from the grooves 15, 16. Between the disc 6 and the rectifier disc 12, are spherical rigid balls placed to position at the annular grooves 18, 19 so as to roll along the grooves 18, 19 with the movement of the disc 6.

OPERATION

With the structure incorporated into a transfer robot, the eccentric shaft 8 is drivingly connected to an electric motor (not shown), while the rectifier disc 14 connects its output shaft 14 to a transfer arm (not shown).

Figure 4:
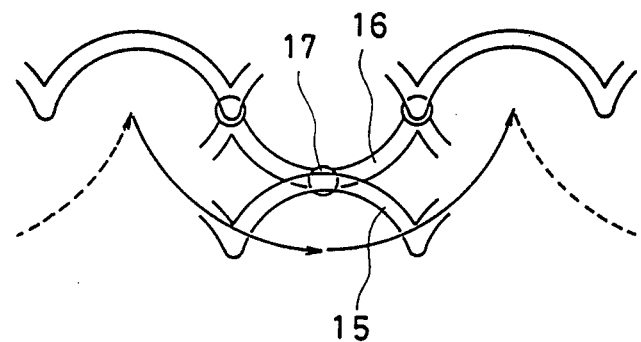
FIG.4 is a view to explain an operation.

In so doing, the motor, once energized, allows the eccentric shaft 8 to rotate in one direction so as to transmit its rotation to the second disc 6 through the end portion 8a. The disc 6 thus subjected to the rotation rotates around the end portion 8a in oscilating relationship between the grooves 15 and 16 through the balls 17 as skematically seen in FIG. 4.

The disc 6 thus moved, on the other hand, allows the balls 20 to roll along the annular grooves 18, 19 so as to transmit only the rotational force to the rectifier disc 12 in the direction reverse to that of the eccentric shaft 8, cancelling the component of the eccentric movement from the disc 6. Thus permits the input shaft 14 of the rectifier disc 12 to rotate so as to activate the transfer arm for carrying such as, for example, an assembly part from one station to another.

In this instance, a reduction ratio is obtained by the ratio of the value two to the value adding the value two to the number of lobes N from the groove 17, that is, $2/(N+2)$, since the eccentric shafts 8 causes its single revolution to make the disc 6 travel by the length of two lobes. Therefore, the number of ten lobes admits a reduction ratio to be $2/(10+2)=1/6$ according to the present embodiment of the invention.

As understood from the description, the structure is such that the discs 4 and 6 are arranged in each opposing relationship, admitting the thickness to be reduced for compactness, obtaining relatively high reduction ratio on the one hand.

Further, connection between the discs 4 and 6 is such that a play such as, for example, backlash between the discs is eliminated to determine the rotational angle of the output shaft 14 with high precision.

In addition, the structure is such that the discs 4 and 6 are positively connected through the balls 17 in substantially solid relationship to be of high rigidity as a whole, while elevating a meshing rate due to the balls 17 tightly placed at the grooves 16, 17.

Furthermore, the thickness-reduced discs 4 and 6 need small inertia force to improve controllability thereof.

Stillfurther, small friction of the balls 17 against the discs 4 and 6 makes it possible to produce an effective speed reduction for a minimum loss of torque.

Figure 5:
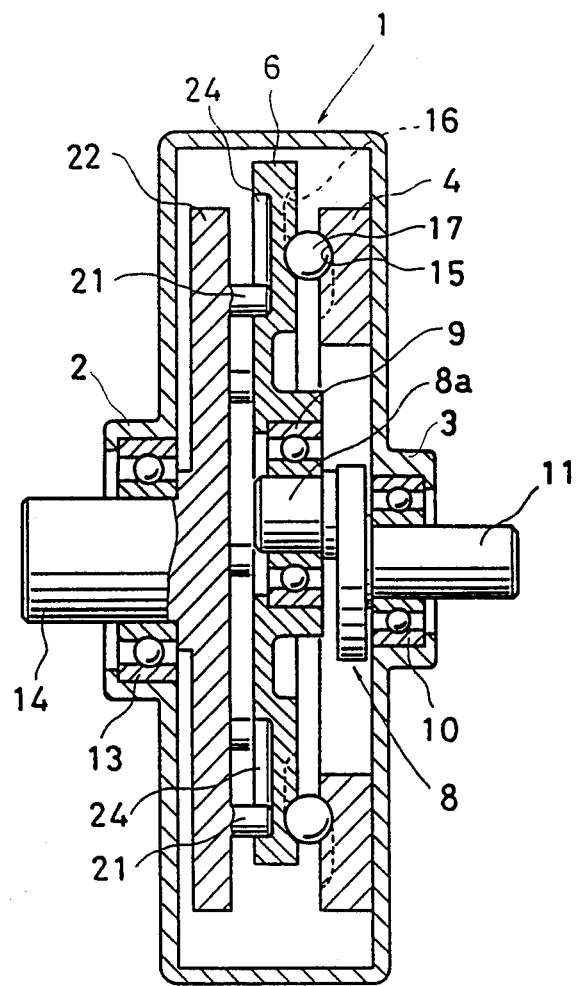
FIG.5 is a view similar to FIG.1 according to second embodiment of the invention.
Figure 6:
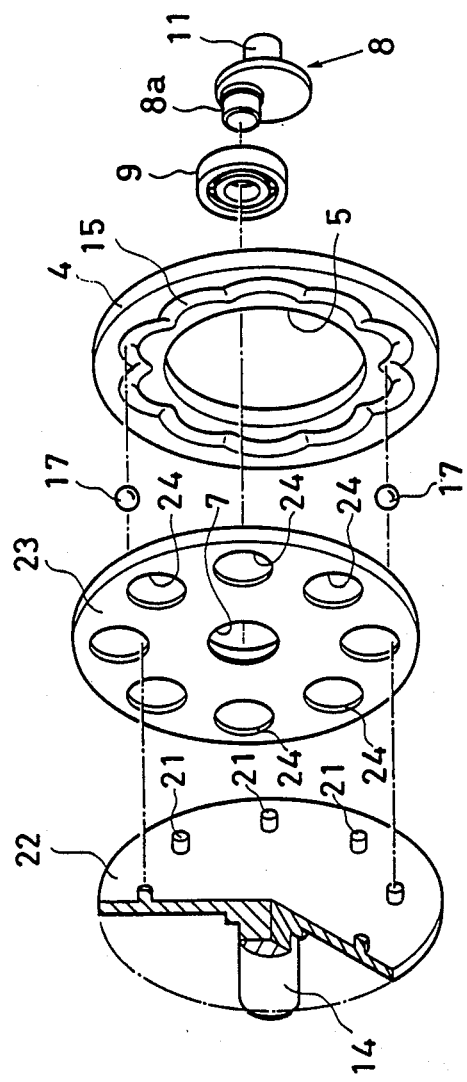
FIG.6 is a view similar to FIG.2 according to the second embodiment of the invention.

Now, FIG.5 and FIG.6 show second embodiment of the invention in which instead of the balls 20, pins 21 are employed to serve as projections. At the rectifier disc 22 are plurality of pins 21 placed in leu of the grooves 19 in parallel relationship with the output shaft 14. With a disc 23, are circular concaves 24 provided into which the pins 21 are admitted to allow the pin to move within the boundary of diametrical dimension of the concave in appliance with the movement of the disc 23. In this situation, the concave determines its diametrical dimension tantamount to the amount of eccentricity based on the grooves 15, 16.

Figure 7:
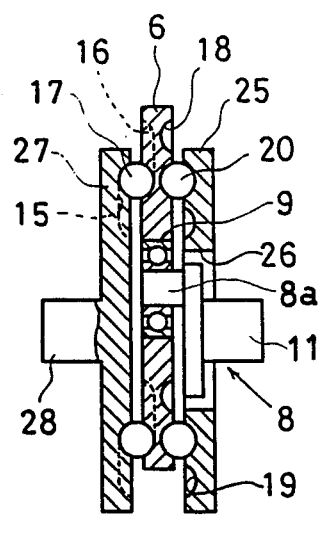
FIG.7 is a view similar to FIG.1 according to third embodiment of the invention, but a casing being removed.

FIG.7 shows third embodiment of the invention in which the circular disc 4 and the rectifier disc 12 according to the first embodiment of the invention are oppositely placed. A rectifier disc 25 has a central hollow portion 26, while a disc 27 has a central output shaft 28 in leu of the central hollow 5 of the first embodiment.

Figure 8:
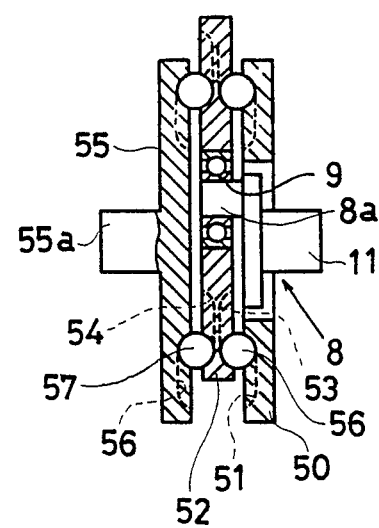
FIG.8 is a view similar to FIG.7 according to fourth embodiment of the invention.

FIG.8 shows fourth embodiment of the invention in which discs are arranged in series to establish a composite speed reduction ratio. Numeral 50 designates a circular disc, a sinuous groove 51 of which counts the number of lobes as, for example, ($\alpha$).

A disc 52 has a sinous groove 53 at one side position to face the groove 51 in which the groove 53 counts the number of lobes as ($\beta$) in a manner to establish a relation $|\alpha-\beta|=2$. The disc 52 also has a sinuous groove 54 at the other side in which counts its number of lobes at ($\gamma$). A drive disc 55 has a central output shaft 55a at one side, and a sinuous groove 56 at the other side positioned to face the groove 54 in which the groove 56 counts the number of lobes as ($\delta$) in a manner to establish a relation $|\gamma-\delta|=2$. Between the groove 51 and 53 is a group of rollable balls 56 provided, while between the grooves 54 and 56 being a group of rollable balls 57 provided.

With this structure, the eccentric shaft 8 transmits its rotation to the disc 52, causing the disc 52 to rotate around the input end 8a, and at the same time, going around the pitch circle of the grooves 51, 53. A single rotation of the shaft 8 permits the disc 52 to travel by the length equivalent to that of two lobes of the groove. The disc 52 thus actuated imparts only the rotational component to the output disc 55 through the group of the balls 57, because the balls rolling along the annular grooves 54, 56 allow the going-around movement of the disc 52 to be cancelled.

Speed reduction ratios obtained from the fourth embodiment of the invention is shown below, in which the affixes the notations $(+)$ and $(-)$ at the values of reduction ratios depending upon its rotational directions such as clockwise and counterclockwise.

As single rotation of the eccentric shaft 8 allows the disc 52 to travel by the rotation equivalent to that of $(-2/\beta)$ when the relation between the number of lobes ($\alpha$) from the groove 51 and that of the lobes ($\beta$) from the groove 53 is $\alpha>\beta$, while yielding $(+2/\beta)$ when the relation between the number of lobes being $\alpha<\beta$ contrary to the previous case, On the other hand, a single rotation of the eccentric shaft 8 allows the disc 55 to travel by the rotation equivalent to that of $(-2/\gamma)$ when the relation between the number of lobes ($\gamma$) from the groove 54 and that of the lobes ($\delta$) from the groove 56 is $\gamma>\delta$, while yielding $(+2/\gamma)$ when the relation between the lobes $\gamma>\delta$. As a consequence, relation between the number of lobes and reduction ratio is as indicated in Table 1.

TABLE 1

| number of lobes | | reduction ratio | case |
|---|---|---|---|
| $\alpha > \beta$ | $\gamma > \delta$ | $-2/\beta - 2/\gamma$ | (A) |
| | $\gamma < \delta$ | $-2/\beta + 2/\gamma$ | (B) |
| $\alpha < \beta$ | $\gamma > \delta$ | $+2/\beta - 2/\gamma$ | (C) |
| | $\gamma < \delta$ | $+2/\beta + 2/\gamma$ | (D) |

When the combined number of lobes between the grooves are designated as seen in Table 2, the case (A) from the Table 1 is applied to calculate reduction ratios.

TABLE 2

| $\alpha$ | $\beta$ | $\gamma$ | $\delta$ | reduction ratio |
|---|---|---|---|---|
| 10 | 8 | 10 | 8 | $-2/8 - 2/10 = -9/20$ |
| 10 | 8 | 12 | 10 | $-2/8 - 2/12 = -5/12$ |
| 12 | 10 | 10 | 8 | $-2/10 - 2/10 = -2/5$ |

This instance results in the output disc 55 rotating in a direction reverse to that of the shaft 8, progressively decreasing the reduction ratio just obtained by addition.

When the combined number of lobes between the grooves are designated as seen in Table 3, the case (B) from the Table 1 is applied to calculate reduction ratios.

TABLE 3

| α | β | γ | δ | reduction ratio |
|---|---|---|---|---|
| 10 | 8 | 8 | 10 | $-2/8 + 2/8 = \pm 0$ |
| 10 | 8 | 10 | 12 | $-2/8 + 2/10 = -1/20$ |
| 12 | 10 | 8 | 10 | $-2/10 + 2/8 = +1/20$ |

This instance results in differential action between the disc 50 and 55 for insuring medium reduction ratios.

The combined number of lobes between the grooves is such as seen in Table 4, the case (C) from Table 1 is applied to determine reduction ratios.

TABLE 4

| α | β | γ | δ | reduction ratio |
|---|---|---|---|---|
| 8 | 10 | 10 | 8 | $+2/10 - 2/10 = \pm 0$ |
| 10 | 12 | 10 | 8 | $+2/12 - 2/10 = -1/30$ |
| 8 | 10 | 12 | 10 | $+2/10 - 2/12 = +1/30$ |

This instance results in differential action between the disc 56 and 55 in a manner similar to that of above for insuring high reduction ratios.

The case (D) from Table 1 is applied when the combined number of lobes is as seen in Table 5.

TABLE 5

| α | β | γ | δ | reduction ratio |
|---|---|---|---|---|
| 8 | 10 | 8 | 10 | $+2/10 + 2/8 = +9/20$ |
| 8 | 10 | 10 | 12 | $+2/10 + 2/10 = +2/5$ |
| 10 | 12 | 8 | 10 | $+2/12 + 2/8 = +5/12$ |

This instance results in the output disc 55 rotating in a direction similar to that of the shaft 8, progressively decreasing the reduction ratios obtained by addition.

As understood from above description, discs connected in series makes it possible to obtain reduction ratios changing from low to high ratios as listed in Tables 2~5.

Figure 9:
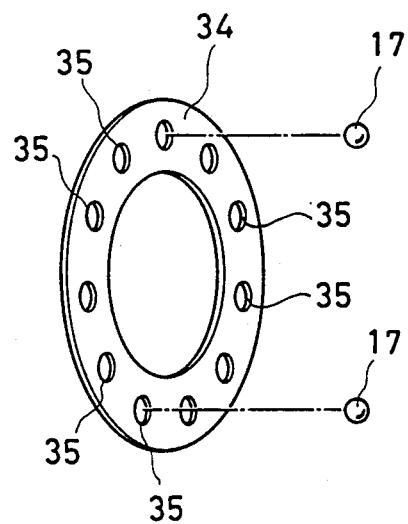
FIG.9 is a perspective view of a retainer.

FIG. 9 shows a cage or a retainer 34 to place rollable balls 17 in position so as to make mounting operation easy when the balls are mounted. For this purpose, the ring-shaped retainer 34 has holes 35 in an angular direction into which the balls are fitted. Another retainer of this kind may be employed to the balls 20.

It is noted that sinuous and annular grooves may be formed V-shaped in section to make the balls come into line-contact with the inner walls of the grooves. Further, these balls are made from tough and wear-resistant material. It is appreciated that annular grooves into which steel balls are admitted may be altered into circular cavity. It will be apparent for those versed in the art that various modifications and variations should be made within the scope and spirit of the invention.

What is claimed is:

1. A gearless differential speed reducer structure comprising:

a crank-shaped eccentric shaft having input and output ends, and disposed to receive a rotary movement;

a second disc fixed to a stationary member in a manner to rotationally admit said eccentric shaft through a central hole provided within said second disc;

an epicycloidal-related groove provided on a facing surface of said second disc to run continuously along a predetermined circle with a single wave as a lobe;

a first disc rotationally mounted on said output end of said eccentric shaft through a bearing to adjacently face said surface of said second disc;

a hypocycloidal-related groove provided on a facing surface of said first disc to run continuously along a predetermined circle with a single wave as a lobe;

both said grooves being recessed in a direction perpendicular to the surface of said discs and having two opposed side walls of the same height and the width of each groove being uniform through the lobes thereof;

rollable balls located on the groove of said first and second discs with the spherical surfaces thereof always contacting the walls of each groove and rolling along the grooves thereof upon actuation of said eccentric shaft, converting rotary movement of said first disc into a rotation component and a revolution component;

a rectifier disc rotationally mounted on a shaft to face another surface opposite the grooved surface of said first disc so as to provide a speed reduction output;

a rectifier means provided between said first disc and said rectifier disc to absorb the revolution component of said first disc and to transmit only the rotational component to said rectifier disc; and the difference between the number of lobes of said first disc and that of said second disc being two.

2. Gearless speed reducer structure as recited in claim 1 comprising:

annular grooves provided within said first disc and said rectifier disc and having a diameter corresponding to the eccentricity of said eccentric shaft, and rollable balls positioned into said annular grooves.

3. Gearless speed reducer structure as recited in claim 1 comprising;

a circular concavity provided within said first disc and said rectifier disc disposed to face each other and having a diameter corresponding to the eccentricity of said eccentric shaft, and rollable balls positioned into said annular grooves.

4. Gearless speed reducer structure as recited in claim 1 comprising:

projections provided within said rectifier disc;

circular concavities provided within said first disc to admit said projection thereinto having a diameter corresponding to the eccentricity of said eccentric shaft.

5. Gearless speed reducer structure as recited in claim 1 wherein said rollable balls are made of wear-resistant ceramics.

6. Gearless speed reducer structure as recited in claim 1 wherein a rotary disc is provided to face against said first disc, with the facing sides of said rotary and first discs having cycloidal grooves along a predetermined circle within which rollable balls are placed.

* * * * *